United States Patent [19]
Flammer, III

[11] Patent Number: 5,488,608
[45] Date of Patent: Jan. 30, 1996

[54] METHOD AND SYSTEM FOR ROUTING PACKETS IN A PACKET COMMUNICATION NETWORK USING LOCALLY CONSTRUCTED ROUTING TABLES

[75] Inventor: George H. Flammer, III, Cupertino, Calif.

[73] Assignee: Metricom, Inc., Los Gatos, Calif.

[21] Appl. No.: 227,774

[22] Filed: Apr. 14, 1994

[51] Int. Cl.⁶ ........................................... H04J 3/26
[52] U.S. Cl. ........................................ 370/85.13; 370/94.3
[58] Field of Search ................................. 370/94.1, 94.3, 370/94.2, 60, 60.1, 58.1–58.3, 85.13, 85.14, 17, 16

[56] References Cited

U.S. PATENT DOCUMENTS

| | | | |
|---|---|---|---|
| 4,905,233 | 2/1990 | Cain et al. | 370/17 |
| 4,974,224 | 11/1990 | Boone | 370/94.1 |
| 5,007,052 | 4/1991 | Flammer | 370/94.3 |
| 5,031,093 | 7/1991 | Hasegawa | 370/17 |
| 5,079,768 | 1/1992 | Flammer | 370/94.1 |
| 5,088,032 | 2/1992 | Bosack | 370/94.1 |
| 5,115,433 | 5/1992 | Baran et al. | 370/94.1 |
| 5,142,531 | 8/1992 | Kirby | 370/94.3 |
| 5,253,161 | 10/1993 | Nemirovsky et al. | 370/94.1 |
| 5,253,248 | 10/1993 | Dravida et al. | 370/16 |
| 5,265,092 | 11/1993 | Soloway et al. | 370/60 |

*Primary Examiner*—Douglas W. Olms
*Assistant Examiner*—Ajit Patel
*Attorney, Agent, or Firm*—Townsend and Townsend and Crew; Kenneth R. Allen; Stephen J. LeBlanc

[57] ABSTRACT

In a packet communication system, wherein nodes are assigned an absolute coordinate-based address and routing decisions are made at each node without the use of directory-based routing, routing decisions made for a particular packet with an ultimate destination are stored at each node so that the next packet sent by that node to that same ultimate destination can be forwarded in accordance with the previous routing decision made for that destination. Routing decisions are stored locally at each node in a routing table. In one embodiment, nodes also store routing information about the source node for a packet so that when a return packet is received for the original source, the relay node will not have to make a routing decision.

12 Claims, 2 Drawing Sheets

Microfiche Appendix Included
(1 Microfiche, 28 Pages)

5,488,608

METHOD AND SYSTEM FOR ROUTING PACKETS IN A PACKET COMMUNICATION NETWORK USING LOCALLY CONSTRUCTED ROUTING TABLES

BACKGROUND OF THE INVENTION

The invention relates generally to a method for routing data packets through a packet communication network and more specifically to a method for routing data packets in a network where the best paths between nodes are stored in a routing table generated at each node.

Packet communication is a form of data communication whereby segments or packets of data are routed with error checking and confirmation of receipt. Packets may be transmitted directly between a source node and a destination node or may be relayed via a number of relay nodes. Several methods of data packet routing are known.

One method is known as directory-based routing. According to this method the address in the header of a packet is used as an index to a directory of packet routing lists stored in a source node. A packet routing list consists of an ordered list of packet node identifiers or call signs that represent a complete transmission path from the source node to the destination node. Once the packet is sent from the source node, its path through the network is determined by the packet routing list that was stored in the source node. Packet routing lists must be prepared with knowledge about the connectivity of each node in the network, and in a typical directory-based routing scheme, each node must maintain a complete routing list for every other node in the network to which it sends packets. Directory-based routing schemes require continued maintenance and communication of network interconnection information employed in the directory. Each of these functions drains network resources and this can severely reduce performance in a large network. However, directory-based routing techniques have the advantage of permitting optimization of routing for a wide variety of network parameters, including data delay, throughput, reliability, priority and the like.

Another basic family of routing techniques are the non-directory-based routing techniques. In non-directory-based routing, the complexities associated with directory-based routing techniques are avoided. There is no need to store connectivity information for each transmitting node in the network, thus reducing the amount of overhead processing that must be done by the network to preserve network connections. However, non-directory-based routing techniques generally do not permit network parameter optimization.

In U.S. Pat. No. 4,939,726, issued to Baran, et al., and assigned to the assignee of the present invention, a non-directory-based routing method and system that permit network parameter optimization are disclosed. According to the method described therein, each node in a network is uniquely identified by absolute geographical coordinates or by a code indicating absolute location in an external coordinate-based reference system (node coordinates), and such absolute geographical coordinates or the equivalent are employed as part of a packet identifier for each packet. A means at each node through which a packet is routed uses the packet destination coordinates and the node coordinates of its neighboring nodes to determine a desired forwarding route of a data packet. A routing decision is made for each packet that is received, even if that packet is directed to a destination for which the node has already received a packet. The routing may be prioritized according to preselected criteria, preferably achieving optimum forward progress, that is, maximum forward progress using the least amount of power and taking into account characteristics of the system.

Accordingly, the Baran packet routing method uses no routing directory or table to perform data routing. Each node of the network collects or is otherwise provided with information about the quality of communication between itself and the neighboring nodes within the node's communication range. When a data packet has been received at a node, the data packet is routed further through the network based on criteria derived from the history of communication between the local node and its neighbors. The criteria include distance, power requirements, retry history (reliability), throughput history, speed of transfer (net data rate), network delay, and data priority. Typically, there is an initialization procedure which is executed to determine the latitude and longitude of neighbors within a destination quadrant, and the criteria are weighted in accordance with preselected preferences to establish, at each subject node, a link quality (LQ) factor for each possible destination local to the subject node. For each packet received and needing to be forwarded, a node in the Baran system creates a list of possible relay nodes, orders that list, and then polls the neighboring nodes to see which node is available.

While the system disclosed in Baran has been shown to perform well and with advantages over directory-based routing schemes, there is a cost and delay in the Baran network due to each node in the network having to make a routing decision about each packet it receives. What is needed is a network and a routing method that preserves the advantages of the Baran coordinate-based addressing scheme but that does not require the overhead and processing of every packet that is required in the Baran system to make a routing decision about each packet.

SUMMARY OF THE INVENTION

According to the invention, in a packet communication system wherein nodes are assigned an absolute coordinate-based address, and wherein routing decisions are made at each node without the use of directory-based routing, routing decisions made for a particular packet with an ultimate destination are stored at each node so that the next packet sent by that node to that same ultimate destination can be forwarded in accordance with the first routing decision made for that destination. Routing decisions are stored at each node in a local routing table. In one embodiment, nodes also store routing information about the source node for a packet so that when a return packet is received for the original source, the relay node has already calculated the appropriate routing decision.

During the course of network operation, each node will construct and maintain a routing table useful for directing packets to a next node towards their ultimate destination. In accordance with the method according to the invention, a routing decision must be made about a packet to an ultimate destination only the first time a packet either to that destination or from that destination is received. A relay node that receives a packet for a destination node determines a next relay node for that packet based on the absolute coordinate-based address of the destination node. Once a relay node has determined a next relay node for an ultimate destination, that information is stored in a routing table and subsequent packets received at the relay node to that ultimate destination are immediately routed to the next relay node listed in the routing table. In one embodiment of the invention, a relay node also stores a next relay node for the source node of packets it receives by assuming that the relay node from which it just received a packet is the best next relay for packets going back to that source node. In this way, when the relay node receives a return packet from the destination going back to the source, it will not have to make a routing decision for that packet but will instead forward it back along the path from which it came.

A network system built according to the invention is different from directory based routing systems in that each routing decision for a packet is made locally at each node. A source node does not specify a complete path to reach a destination node, but only sends the packet to a neighboring node in the direction of the ultimate node and that neighboring node determines the next relay node in the path to the ultimate node. A network system built according to the invention is different from the Baran system in that the local decisions about routing are stored locally and are then available for use in routing other packets. Unlike Baran, a node does not need to make a routing decision each time a packet is received and this greatly enhances the speed and efficiency of the network.

The invention will be better understood by reference to the following detailed description in connection with the accompanying drawings.

DETAILED DESCRIPTION OF SPECIFIC EMBODIMENTS

Figure 1:
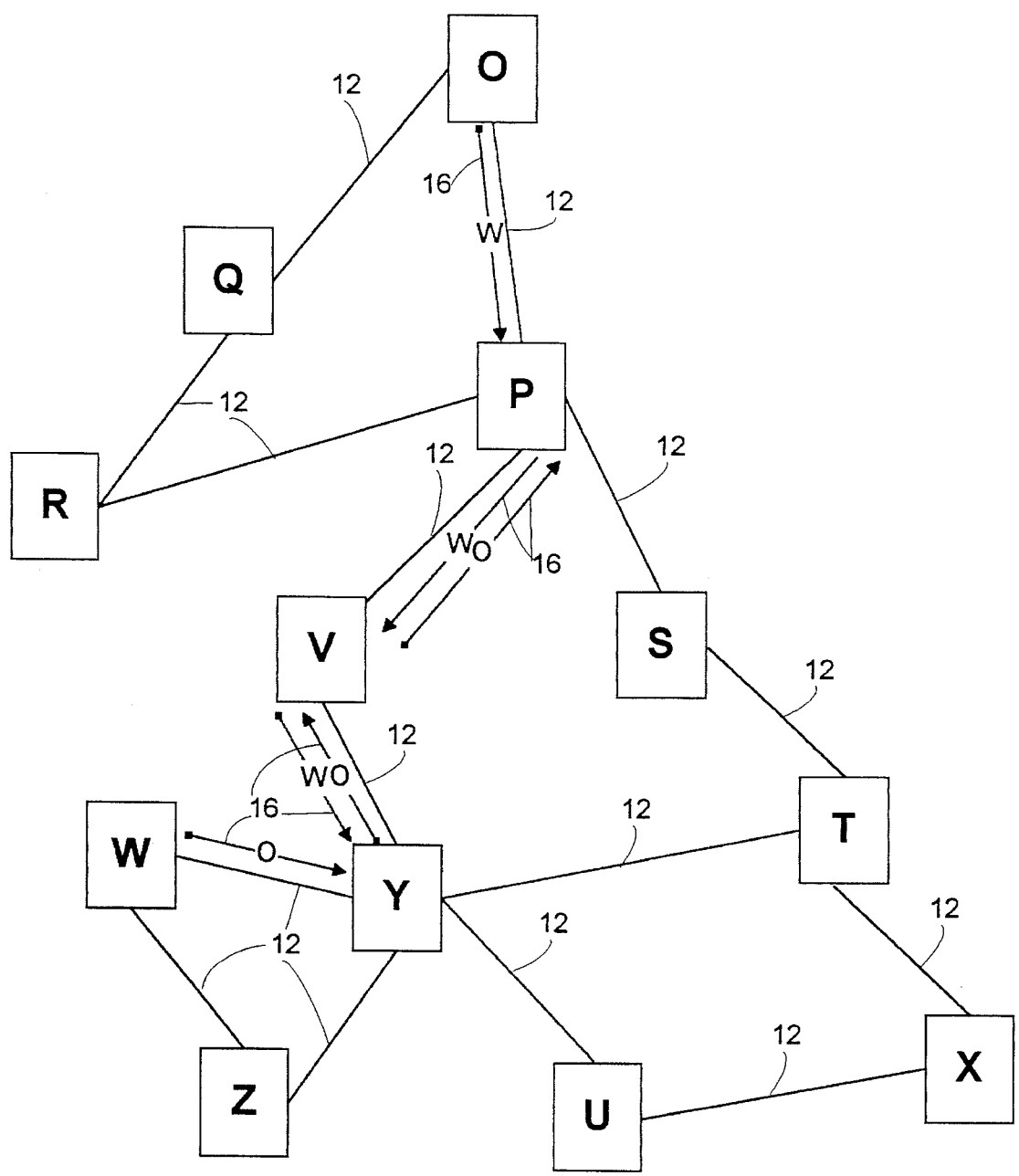
FIG. 1 is a block diagram illustrating a general data network topology according to the invention.

FIG. 1 shows a data network according to the present invention. The network consists of nodes labelled O through Z interconnected by paths 12 representing allowable communication links between nodes. Routing table entries, represented by the arrows 16, exist between certain nodes to speed up transmission of packets to a destination for which a routing decision has been made.

Data transmission between a source node and a destination node occurs as follows. If node W wishes to transmit a packet of information to node O, node W will prepare the packet of data, along with a header that identifies node W as the source, node O as the destination, and gives the absolute coordinate-based address for itself and for node O. Node W will then check its routing table to see if there is an entry there for node O. If there is not an entry for node O, node W will make a routing decision, as in the Baran system, by examining all of the nodes with which it can communicate (in this case Z and Y, also referred to as node W's neighboring nodes), ordering those nodes according to which is most advantageous to transmit in the direction of node O, and sending a polling packet to the most advantageous node to determine if it is available to receive a data packet. Once node W has determined that a neighboring node is available for relaying a packet to node O, node W will then send the data packet to the selected node (in this case node Y) along with a header identifying the source and destination of the packet and identifying itself as the transmitter. According to the invention, once node W determines that node Y is the relay node it will transmit to in order to get a packet to ultimate destination O, node W stores that information in a routing table. The next time node W wishes to transmit a packet to node O, it checks its routing table, finds an entry for O, and immediately transmits the packet to node Y without going through the process of making a routing decision that is described above.

When node Y receives the packet, it too checks its own routing table to see if it has an entry for the destination node O. If it does, the packet is immediately relayed to the node listed as the next node in the routing table. If it does not, node Y goes through the process of making a routing decision described above and then stores the next node (in this case V) in its routing table as an entry for node O and then forwards the packet to the next node.

When node V receives the packet, it looks in its routing table for node O and if it finds an entry sends the packet along to the node listed in that entry. If there is no entry for O, node V makes a routing decision as described above and then creates a routing table entry for O. At the same time, node V also checks its routing table and a neighboring node list to see if there is an entry for node W, the original source node for the packet. If there is not an entry for node W, node V creates a routing table entry for node W and uses the node from which it received the packet from W (in this case node Y) as the next relay node for packets going back to W. In this way, if node V receives a response packet back from O to W, it will immediately forward that packet to node Y without having to make a new routing decision for that packet. The table below is a representation of the cache routing table of node V after it has received and transmitted the packet from node W for node O.

| Routing Table Entry | Destination Node | Next Relay Node |
|---|---|---|
| 1 | O | P |
| 2 | W | Y |

The nodes according to the present invention are designed so that the routing table keeps track of when the last time each entry was used. When the routing table is full, the least recently used entry is discarded each time a node makes a new routing decision for a packet and a new entry is created.

Figure 2:
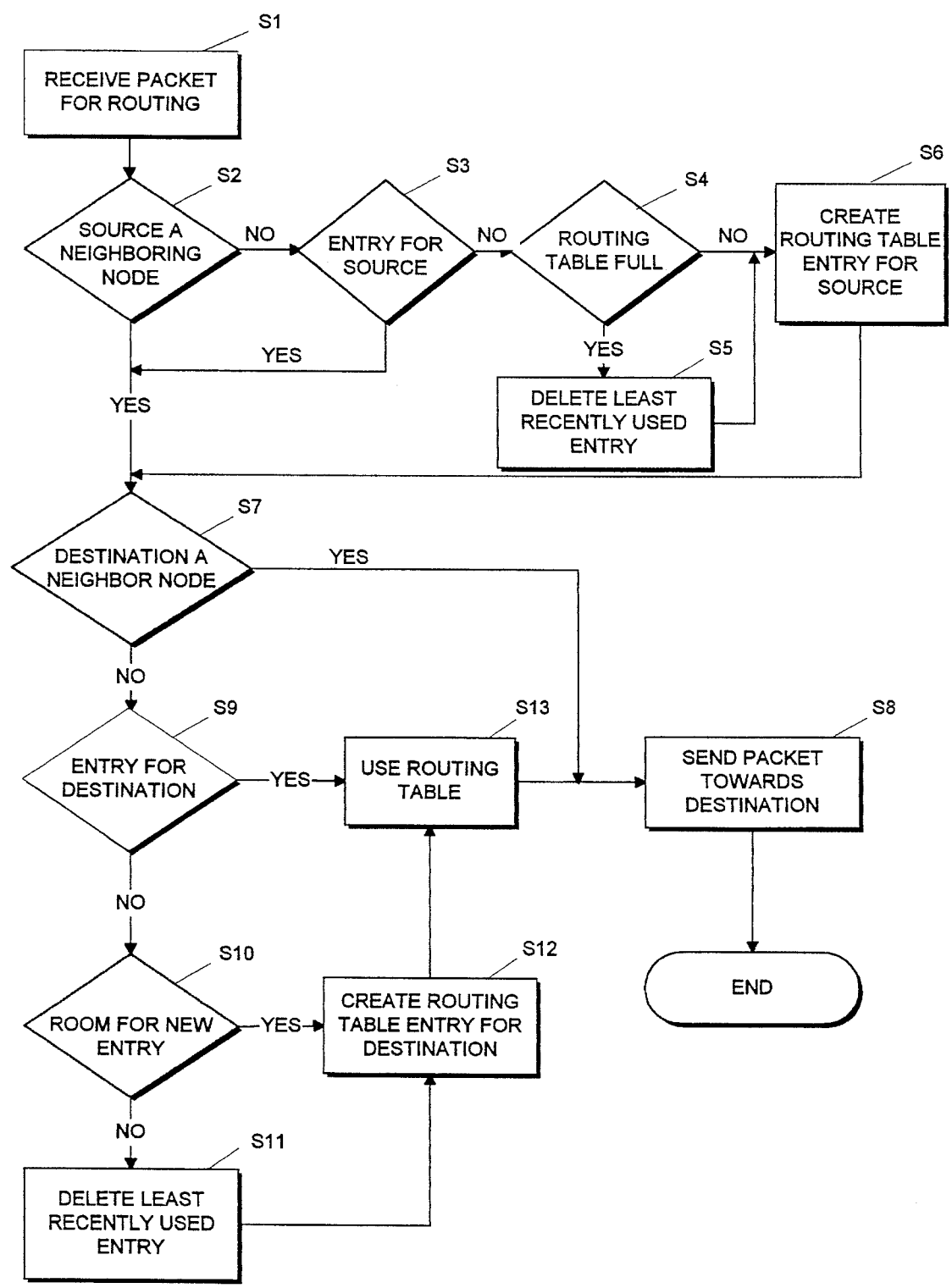
FIG. 2 is a flow chart describing the operation of a relay node upon receiving a packet addressed to a destination node.

FIG. 2 depicts a flow chart illustrating the operation of a relay node according to one embodiment of the present invention. While the steps of this process are shown in a particular order, it will be obvious to one of ordinary skill in the art that the order of some of the subprocesses contained in this process could be changed and that some steps of this process could be handled in parallel. The process begins when the relay node receives a packet for routing (Step S1). As described above, the packet contains the absolute-address of the source node, the destination node, and the address of the neighboring node from which the packet was transmitted. The relay node first examines the source node identifier of the packet to determine if that source node is a neighboring node to which it can transmit directly (Step S2). If it is not, the relay node examines its routing table to see if there is an entry for that source node (Step S3). If there is not an entry, the source node checks to see if the routing table is full (Step S4) and deletes the least recently used entry if it is (Step S5). The relay node then creates a routing table entry for the source node (Step S6).

Once processing of the source node identifier is complete, the relay node examines the destination node identifier of the packet. If the destination node is a neighboring node to which the relay node can communicate directly (Step S7), it sends the packet (Step S8). If it is not, the relay node then examines its routing table to determine if there is already an entry for the destination node (Step S9). If there is not a routing table entry for the destination node of the packet, the relay node checks to see if there is room for a new entry in the routing table (Step S10). If there is no room for a new entry in the routing table, the node deletes the least recently used entry to make room for a new entry (Step S11). The relay node then creates a new routing table entry for the destination (Step S12). The destination entry is created by the process of making a routing decision described above and described in the Baran patent. Once a routing table entry has been created for the destination node, the relay node uses that entry (Step S13) to forward the packet towards its destination (Step S8).

A number of modifications to this procedure will be obvious to one of ordinary skill in the art. For example, the steps that process the source node identifier and create a source node entry could be performed after the packet is sent or while the packet is being sent. Another example is that the source node routing table entry may always be updated even when an old entry exists for that source node.

The invention has now been explained with reference to specific embodiments. Other embodiments will be apparent to those of ordinary skill in the art. It is therefore not intended that this invention be limited except as indicated by the appended claims.

What is claimed is:

1. A method for routing packets of data without a network directory comprising the steps of:

assigning to each node in a network an identifier indicative of coordinate location, said identifier including an absolute coordinate value;

addressing a packet to an ultimate destination node by designating in a packet header said ultimate destination node only by said coordinate value of said ultimate destination node and without designating a complete intermediate path to said ultimate destination node such that the network is free to route the packet via any intermediate path to said ultimate destination node;

at a relay local node, selecting upon first receipt of a packet for a destination node one neighboring node by using said absolute coordinate value of said destination node and other information specific to said relay local node according to preselected criteria;

storing at said relay local node an identifier of said selected neighboring node along with a label for said ultimate destination node in a routing table;

forwarding said packet to said selected neighboring node for eventual delivery to said ultimate destination node; and retrieving said identifier of said selected neighboring node from said routing table when a subsequent packet for said ultimate destination node is received at said relay local node and forwarding said subsequent packet to said selected neighboring node indicated by said identifier.

2. The method according to claim 1 wherein said selecting step includes using said packet header to determine distance of said neighboring nodes relative to said ultimate destination node.

3. The method according to claim 1 wherein said selecting step includes developing a local table for maintaining communication history between said local nodes and said neighboring nodes.

4. The method according to claims 1, 2, or 3 further comprising the step of:

storing at said relay local node an identifier for a neighboring node from which the packet was received along with a label for a source node of said packet in a routing table; and retrieving said identifier for said neighboring node from which the packet was received from said routing table when a return packet directed to said source node is received at said relay local node; and forwarding said return packet to said transmitted from neighboring node for eventual delivery to said source node.

5. The method according to claim 3 wherein a link quality factor is employed to define preferred communication paths.

6. A system for routing packets of data in a packet data communication network without a network directory comprising:

a plurality of nodes in a network, each node including an identifier indicative of coordinate location, said identifier including a coordinate value referenced to a terrestrial grid;

means for addressing a packet to an ultimate destination node by designating in a packet header said ultimate destination node only by said coordinate value of said ultimate destination node and without designating a complete intermediate path to said ultimate destination node such that the network is free to route the packet via any intermediate path to said ultimate destination node;

means at each of said plurality of nodes for selecting upon first receipt of a packet for a destination node a neighboring node by using said identifier indicative of coordinate location of said destination node; and means at each of said plurality of nodes for storing a routing table entry for an ultimate destination of a packet, said routing table entry selected by an identifier for said ultimate destination node and including information identifying a neighboring node as a forwarding node for said ultimate destination.

7. A system for routing packets of data without a network directory comprising:

a plurality of nodes in a network, each node including an identifier indicative of geographic location, said identifier including a coordinate value referenced to a terrestrial grid;

means for addressing a packet to an ultimate destination node by designating in a packet header said ultimate destination node only by said coordinate value of said ultimate destination node and without designating a complete intermediate path to said ultimate destination node such that the network is free to route the packet via any intermediate path to said ultimate destination node; and at a local node, means for selecting at least one of said neighboring nodes upon first receipt of a packet for said destination node by using said packet header and other information specific to said local node according to preselected criteria;

means for forwarding said packet to said selected neighboring nodes for eventual delivery to said ultimate destination node; and means at each of said plurality of nodes for storing a routing table entry for an ultimate destination of a packet, said routing table entry selected by an identifier for said ultimate destination node and including information identifying a neighboring node as a forwarding node for said ultimate destination.

8. The system according to claim 7 wherein said selecting means comprises means for selecting one neighboring node requiring the least amount of power for forwarding said packet.

9. The system according to claim 7 wherein said selecting means includes means for using said packet header to determine distance of neighboring nodes relative to said ultimate destination node.

10. The system according to claim 7 wherein said selecting means includes means for developing a link list for maintaining communication history between said local nodes and said neighboring nodes.

11. The system according to claim 10 wherein said link list maintains information about said neighboring nodes on at least one of the following criteria: distance, output power required to establish communication, retry history (reliability), throughput history, speed of transfer (net data rate), network delay, data priority, link utilization percentage, closeness to desired destination, closeness to desired bearing, randomness, and closeness to local bearing.

12. The system according to claim 10 wherein a link quality factor is employed to define preferred communication paths.

* * * * *